United States Patent
Andall et al.

(10) Patent No.: US 12,210,150 B2
(45) Date of Patent: Jan. 28, 2025

(54) HEAD-MOUNTABLE DISPLAY SYSTEMS AND METHODS

(71) Applicant: Sony Interactive Entertainment Inc., Tokyo (JP)

(72) Inventors: Hogarth Andall, London (GB); Calum Armstrong, London (GB); Philip Cockram, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/865,499

(22) Filed: Jul. 15, 2022

(65) Prior Publication Data
US 2023/0015732 A1   Jan. 19, 2023

(30) Foreign Application Priority Data
Jul. 16, 2021 (GB) .................................... 2110250

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0101* (2013.01); *G02B 27/017* (2013.01);
(Continued)

(58) Field of Classification Search
CPC ............ G02B 27/0093; G02B 27/0101; G02B 27/017; G02B 2027/0138; G02B 2027/014; G06V 10/56; G06V 10/60; G06V 40/10
See application file for complete search history.

(56) References Cited

U.S. PATENT DOCUMENTS

| 8,963,806 B1 | 2/2015 | Starner |
| 10,198,866 B2 | 2/2019 | Bickerstaff |

(Continued)

FOREIGN PATENT DOCUMENTS

| CN | 110082909 A | * 8/2019 | ......... G02B 27/0093 |
| EP | 3008698 A1 | 4/2016 | |

(Continued)

OTHER PUBLICATIONS

English Translation of CN-110082909-A (Year: 2019).*

(Continued)

*Primary Examiner* — Lixi C Simpson
(74) *Attorney, Agent, or Firm* — Kilpatrick Townsend & Stockton LLP

(57) ABSTRACT

A system includes one or more sensors to detect one or more properties for a current user wearing a head-mountable display (HMD), control circuitry to select a user profile from a plurality of stored user profiles in dependence upon one or more of the detected properties, where each stored user profile is associated with a respective user and includes data indicative of one or more reference properties for the respective user, where the selected user profile includes data indicative of at least one reference property that is substantially the same as at least one of the one or more of the detected properties, and processing circuitry to generate at least one of audio and video content for output by the HMD in dependence upon the selected user profile and in response to the selection of the user profile.

11 Claims, 8 Drawing Sheets

(51) Int. Cl.
  *G06V 10/56* (2022.01)
  *G06V 10/60* (2022.01)
  *G06V 40/10* (2022.01)
(52) U.S. Cl.
  CPC ............. *G06V 10/56* (2022.01); *G06V 10/60* (2022.01); *G06V 40/10* (2022.01); *G02B 2027/0138* (2013.01); *G02B 2027/014* (2013.01)

(56) References Cited

U.S. PATENT DOCUMENTS

| | | |
|---|---|---|
| 2010/0157433 A1 | 6/2010 | Mukawa |
| 2014/0362110 A1* | 12/2014 | Stafford ............... G06F 3/011 |
| | | 345/633 |
| 2016/0026853 A1* | 1/2016 | Wexler ............... G06T 7/20 |
| | | 382/103 |
| 2016/0140764 A1 | 5/2016 | Bickerstaff |
| 2017/0337602 A1* | 11/2017 | Davis ............... G06V 40/174 |
| 2018/0107835 A1* | 4/2018 | Clement ............... A63F 13/212 |
| 2020/0082794 A1 | 3/2020 | Sanders |
| 2020/0110865 A1* | 4/2020 | Wu ............... G02B 27/017 |
| 2020/0388054 A1* | 12/2020 | Araújo ............... G02B 27/0025 |
| 2022/0100265 A1* | 3/2022 | Kies ............... G06F 3/017 |
| 2022/0391028 A1* | 12/2022 | Livny ............... G06F 3/0346 |

FOREIGN PATENT DOCUMENTS

| | | |
|---|---|---|
| EP | 3008698 B1 | 4/2016 |
| EP | 1731943 B1 | 2/2019 |
| GB | 2571286 A | 8/2019 |
| WO | 2013033195 A2 | 3/2013 |
| WO | 2014199154 A1 | 12/2014 |
| WO | WO-2019143360 A1 * | 7/2019 |

OTHER PUBLICATIONS

Combined Search and Examination Report for corresponding GB Application No. GB2110250.4, 14 pages, dated Apr. 6, 2022.
Extended European Search Report for corresponding EP Application No. 22183142.3, 10 pages, dated Dec. 8, 2022.
Office Action (Communication pursuant to Article 94(3) EPC) issued in related EP Application No. 22183142.3 on Oct. 23, 2024; 8 pages.

* cited by examiner

HEAD-MOUNTABLE DISPLAY SYSTEMS AND METHODS

FIELD OF THE DISCLOSURE

The present disclosure relates to head-mountable display systems and methods.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices. This type of HMD can position the actual display device in front of the user's eyes, in association with appropriately configured optical components for directing light from the display device towards the positions of the user's eyes for viewing images displayed by the display device. In this way, the user can view one or more images displayed by the display device via the configured optical components which focus light from the display device onto the user's respective eyes.

It has become increasingly common for a group of users, such as a household, to each use a same HMD at different times. Each user typically has their own user profile comprising user-specific data (e.g. personalised settings and/or private information and/or saved games previously played by that user), in which a user typically accesses their user account by manually entering their username and password. Once a user has entered their password, a situation may arise where the user remains logged in to their user profile unless the user subsequently performs a log out operation, which can result in other users potentially obtaining access to the user's profile. As such, members of a same household may each have their own user profile (user account) and use a same HMD at different times and problems can arise in that the different users frequently have to log in and log out of the respective user profiles. In some cases, a first user wearing an HMD may pass the HMD to another user, for example during or after a game session. In this case, the other user may play the game whilst logged in to user profile of the first user and one user's achievements may be attributed to an account/profile of another user who is already logged in and/or one or more output settings (e.g. display settings) of the HMD may be set according to the user profile of the first user.

The presently disclosed arrangement seeks to mitigate this problem by providing a system and method for detecting properties of a current user wearing an HMD and automatically selecting a user profile.

SUMMARY OF THE INVENTION

Various aspects and features of the present disclosure are defined in the appended claims and within the text of the accompanying description. Example embodiments include at least a system, a method, a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
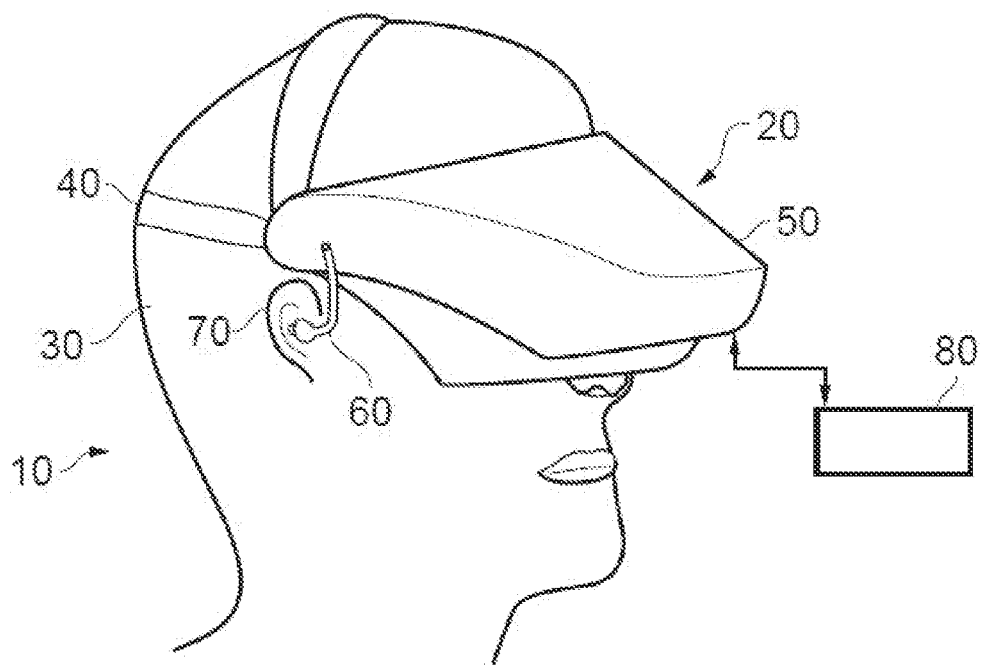
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential. Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera optionally provided as part of the HMD may capture images to the front of the HMD, in use. Such images may be used for head tracking purposes, in some embodiments, while it may also be suitable for capturing images for an augmented reality (AR) style experience. A Bluetooth® antenna may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
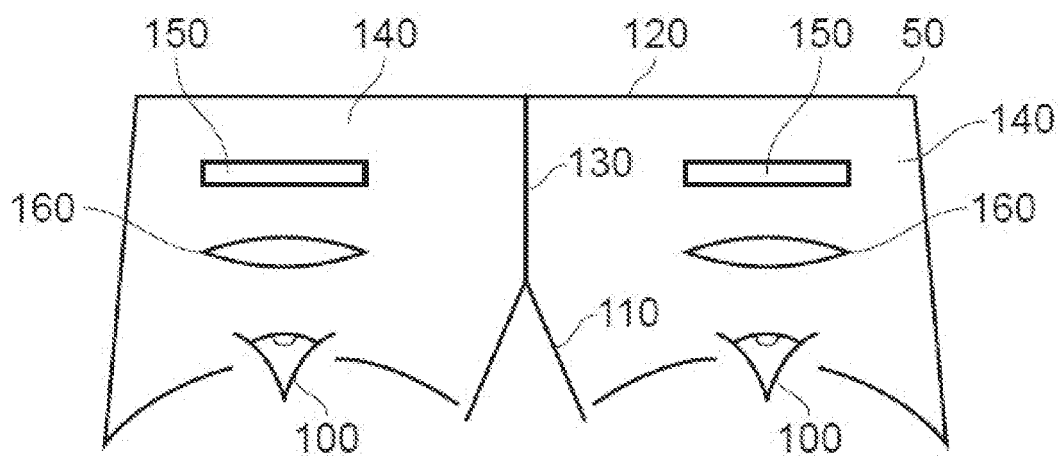
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
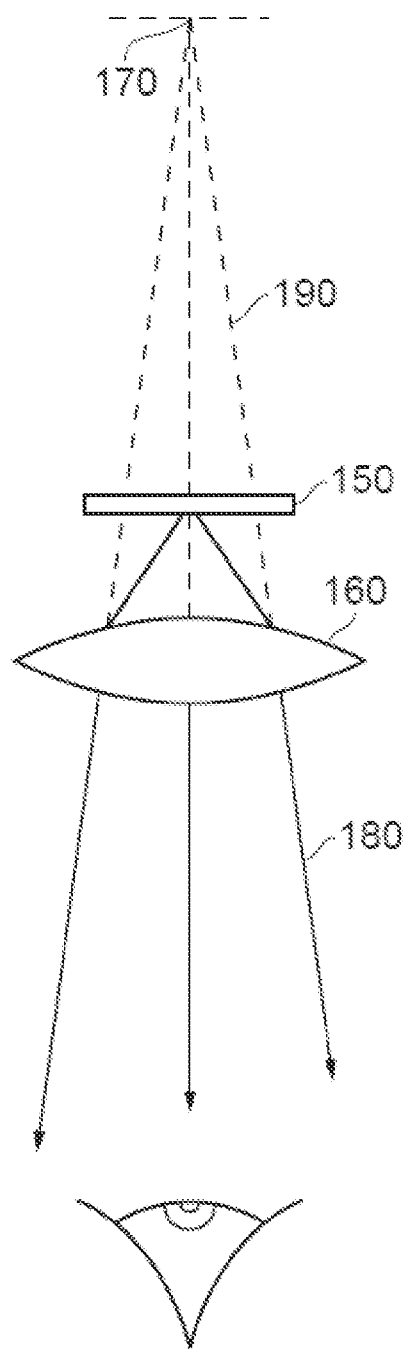
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
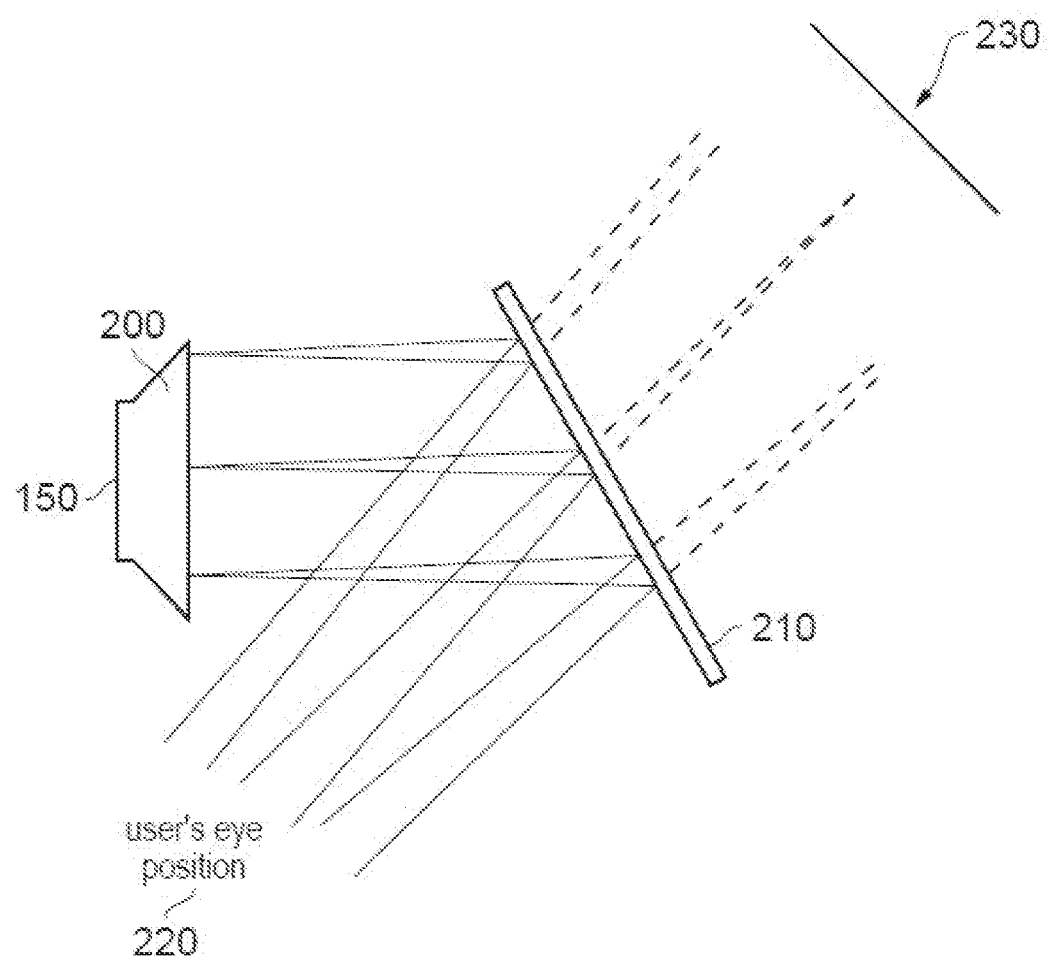
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located. This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers, gyroscopes and/or magnetometers), external cameras operable to image the HMD, and outwards-facing cameras mounted onto the HMD.

Figure 6A:
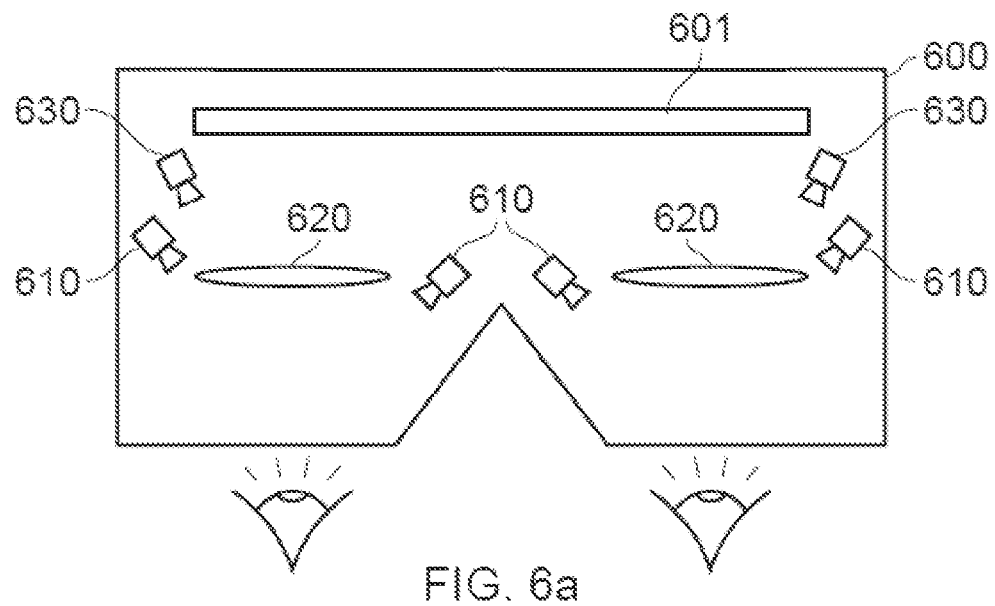
FIG. 6a schematically illustrates a plan view of an HMD.
Figure 6B:
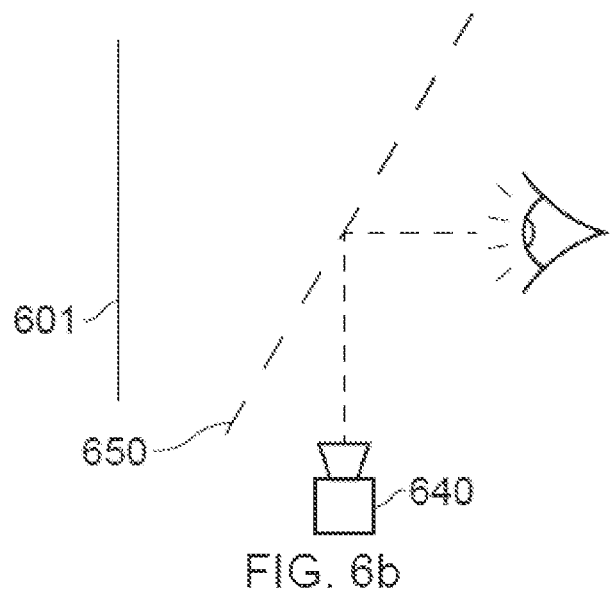
FIG. 6b schematically illustrates a near-eye tracking arrangement.

FIGS. 6*a* and 6*b* schematically illustrate two possible arrangements for performing eye feature detection on an HMD, in which the results of the eye feature detection may be used for gaze tracking and/or eye separation detection (e.g. inter-pupillary distance detection) and/or iris pattern detection. The image sensors provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

FIG. 6*a* shows an example of an image sensor arrangement comprising one or more image sensors (e.g. one or more visible light cameras and/or one or more infra-red (IR) cameras). In the example shown, cameras are arranged within an HMD so as to capture images of the user's eyes from a short distance. This may be referred to as near-eye tracking, or head-mounted tracking. In some examples, a single camera may be positioned within the HMD to capture an image comprising both of the user's eyes or a respective camera may be used for each eye.

In this example, an HMD 600 (with a display unit/display element 601) is provided with cameras 610 that are each arranged so as to directly capture one or more images of a respective one of the user's eyes using an optical path that does not include the optical element 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However, it is considered that in some examples least some of the cameras can be arranged so as to include the optical element 620 in the image captured of the user's eye and/or to include the optical element the optical path used to capture the image of the eye. Examples of such positions in which the camera observes the eye via the optical element 620 are shown by the cameras 630 in FIG. 6*a*. While this may result in processing being required to enable suitably accurate tracking to be performed, due to the deformation in the captured image due to the optical element 620, this may be performed relatively simply due to the fixed positions of the cameras and the tracked position of the optical element 620 in a captured image. An advantage of including the optical element 610 within the optical path may be that of simplifying the physical constraints upon the design of an HMD, for example.

FIG. 6*b* shows another example of an image sensor arrangement in which image sensor can be arranged so as to indirectly capture images of the user's eyes. Such an arrangement may be particularly suited to use with IR or otherwise non-visible light sources, as will be apparent from the below description.

FIG. 6*b* includes a mirror 650 arranged between a display unit/display element 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
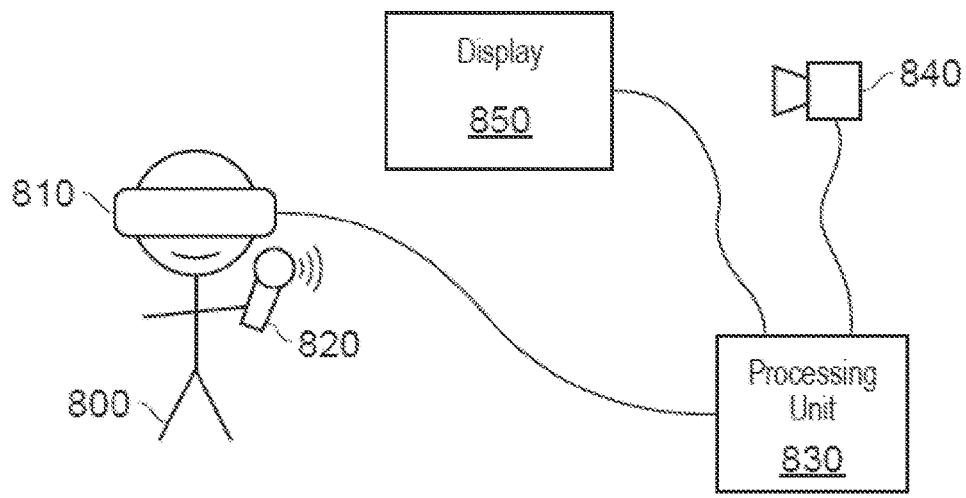
FIG. 7 schematically illustrates a gaze tracking environment.

FIG. 7 schematically illustrates an environment in which an eye feature detection process may be performed using one or more image sensors of an HMD. In this example, the user 800 is using an HMD 810 that is associated with a processing unit 830, such as a games console (e.g. PS5®), with the peripheral 820 allowing a user 800 to input commands to control the processing. The HMD 810 may perform eye tracking in line with an arrangement exemplified by FIG. 6*a* or 6*b*, for example—that is, the HMD 810 may comprise one or more image sensors operable to capture images of either or both of the user's 800 eyes. The processing unit 830 may be operable to generate content for display at the HMD 810; although some (or all) of the content generation may be performed by processing units within the HMD 810.

The arrangement in FIG. 7 also comprises a camera 840, located outside of the HMD 810, and optionally a display 850. In some cases, the camera 840 may be used for performing tracking of the user 800 while using the HMD 810, for example to identify body motion, head motion and/or a head orientation and/or position.

While the connections shown in FIG. 7 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 7 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

The operations to be discussed below relate to detecting one or more properties for a user of an HMD and automatically selecting a user profile from a plurality of stored user profiles so that the user profile for the user of the HMD can be accessed for generating audio and/or video content for output by the HMD. Moreover, the operations to be discussed below relate to systems and methods for identifying a current user of an HMD using one or more sensors and automatically selecting a user profile associated with the identified user without requiring the user to perform a manual login operation thereby facilitating ease of use for an HMD shared among two or more respective users.

Figure 8A:
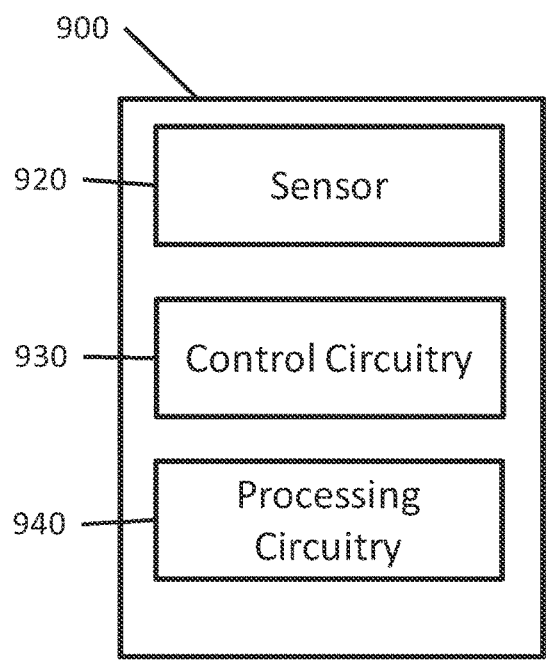
FIG. 8a schematically illustrates a system

FIG. 8*a* schematically illustrates a system 900 for automatically selecting a user profile for a current user of an HMD (e.g. a user wearing or preparing to wear the HMD). In embodiments of the disclosure, the system 900 comprises: one or more sensors 920 to detect one or more properties for a current user of an HMD; control circuitry 930 to select a user profile from a plurality of stored user profiles in dependence upon one or more of the detected properties, wherein each stored user profile is associated with a respective user and comprises data indicative of one or more reference properties for the respective user, wherein the selected user profile comprises data indicative of at least one reference property that is substantially the same as at least one of the one or more of the detected properties; and processing circuitry 940 to generate at least one of audio and video content for output by the HMD in dependence upon the selected user profile and in response to the selection of the user profile.

The control circuitry 930 selects one of the plurality of stored or accessible user profiles in dependence upon one or more of the detected properties so that the selected user profile comprises one or more reference properties that are substantially the same as one or more of the detected properties. In this way, the system 900 can automatically select the user profile for the current user wearing the HMD and audio and/or video content is generated according to the selected user profile so that the output of the HMD is adapted for the current user of the HMD. Therefore, the user profile for the current user of the HMD can be automatically selected and used for generating the content output by the HMD so that the current user does not have to perform a manual login operation.

One or more of the sensors 920 may be provided as part of an HMD and/or one or more of the sensors 920 may be provided as part of another processing device that is local to the current user wearing the HMD, such as a personal computer or a games console (e.g. the PS5®). Similarly, the control circuitry 930 can be provided as part of the HMD and/or as part of another processing device that is local to the current user wearing the HMD, so that the control circuitry 930 can receive data indicative of a detected property for the current user via a wired or wireless communication (e.g. Bluetooth® or Wi-Fi®) and select a user profile from the plurality of stored user profiles in dependence upon the received data. The control circuitry 930 is configured to receive data indicative of a detected property by communicating with any of the one or more sensors 920 via a wired or wireless communication or by communicating with another device that communicates with one or more of the sensors 920 to thereby obtain data indicative of a detected property for the user currently wearing the HMD. Similarly, the processing circuitry 940 can be provided as part of the HMD and/or as part of another processing device that is local to the current user wearing the HMD. The processing circuitry 940 is configured to generate audio and/or video content for output by the HMD. For example, the HMD may comprise one or more audio output units (e.g. earphones) for outputting audio content to the user and a display unit/ display element (e.g. display element 150) for outputting video content. The processing circuitry 940 is configured to generate at least one of audio and video content for output by an audio output unit and a display unit of the HMD, respectively, and the processing circuitry 940 is configured to generate the audio and/or video content according to the user profile selected by the control circuitry 930.

In some examples, the functionality of the processing circuitry 940 may be performed in a distributed manner using a combination of processing devices (for example, a combination of processing performed by an HMD and a personal computer or game console). References herein to images generated by the processing circuitry 940 refer to generating either stereoscopic images for which left images and right images are displayed to the respective eyes or generating a single image that is displayed to both eyes.

Figure 8B:
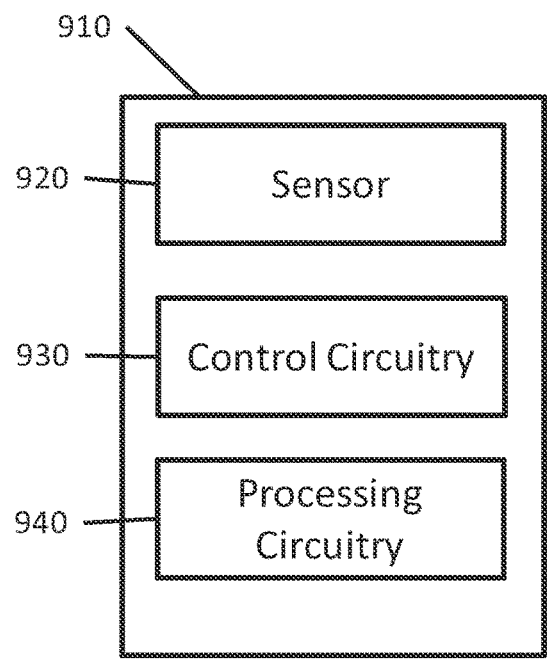
FIG. 8b schematically illustrates an HMD apparatus.

In some examples, the sensor(s) 920, the control circuitry 930 and the processing circuitry 940 may each be provided as part of an HMD (such as the HMD 810 in FIG. 7). FIG. 8b schematically illustrates an example of an HMD 910 comprising: one or more of the sensors 920 to detect a property for the current user wearing the HMD 910; the control circuitry 930 to receive data indicative of the detected property from one or more of the sensor 920 via a wired or wireless communication; and the processing circuitry 940 to generate at least one of audio and video content for output by the HMD 910 in dependence upon the selected user profile in response to the selection by the control circuitry 930 of the user profile. Optionally, the HMD 910 comprises storage circuitry to store data for the plurality of user profiles or the HMD comprises receiving circuitry (not shown in FIG. 8b) to wirelessly receive data for the plurality of user profiles.

In another example, one or more of the sensors 920, the control circuitry 930 and the processing circuitry 940 may each be provided remotely from the HMD as part of a processing device, such as a personal computer or a games console. The control circuitry 930 can thus select a user profile from the plurality of stored user profiles in dependence upon one or more of the properties detected by one or more of the sensors 920, the processing circuitry 930 can generate at least one of audio and video content for output by the HMD in dependence upon the selected user profile, and the audio and/or video content can be communicated to the HMD via a wired or wireless communication.

It will therefore be appreciated that the location of the one or more sensors 920, the control circuitry 930 and the processing circuitry 940 is not particularly limited.

Each of the one or more sensors 920 is configured to detect at least one property for a user when the user is wearing an HMD. Each of the one or more sensors 920 is configured to detect either a physical property for the user currently wearing the HMD or a property for the HMD that is currently worn by the user, in which a detected property for the HMD provides an indication of one or more properties for the current user wearing the HMD.

The one or more sensors 920 may comprise at least one sensor for detecting a position (and changes in a position) of the HMD, such as an image sensor provided as part of the HMD and/or an image sensor provided externally to the HMD to capture one or more images including the HMD and/or an inertial sensor provided as part of the HMD.

The one or more sensors 920 may comprise at least one sensor for detecting a physical property for the user wearing the HMD such as a physical property associated with the current user's eye(s), hand(s) and/or voice. The respective properties detected using the one or more sensors 920 will be discussed in more detail later. More generally, in embodiments of the disclosure the one or more sensors 920 comprise one or more from the list consisting of: a gyroscope, an accelerometer, a magnetometer, a microphone and an image sensor.

The control circuitry 930 is configured to select a user profile from a plurality of stored user profiles in dependence upon one or more of the properties detected by one or more of the sensors 920. Each of the plurality of stored user profiles is associated with a respective user and each user profile comprises data indicative of one or more reference properties for the respective user associated with that user profile. Each of the one or more reference properties is a property for the user that either has been specified by the user in advance or has been previously detected for the user by one or more of the sensors 920 when previously wearing an HMD (e.g. one or more reference properties may have been detected for the user as part of an initial setup procedure when creating the user profile). Each of the one or more reference properties represents a characteristic for the user that can potentially distinguish that user from another user. Examples of reference properties include: a height of the user, a property of an iris of an eye of the user, an inter-pupillary distance of the user, a voice frequency and/or a hand characteristic of the user.

For example, a reference property such as the user's inter-pupillary distance (IPD) may have been detected previously for the user when wearing an HMD and stored as a reference property for the user's profile, or the user may have measured their IPD (e.g. using a ruler) and manually entered a value for the IPD to be stored as a reference property for the user profile. Alternatively or in addition, the user may have manually entered their height in units of distance when creating the user profile, or a previous detection of a displacement of the HMD from a floor indicative of a height for the user may have been performed and the detection result stored as a reference property for the user's profile. Possible reference properties (also referred to as user characteristics) that can be stored for a user profile will be discussed in more detail later.

The control circuitry 930 can select one of the plurality of stored user profiles in dependence upon a degree of match between one or more of the detected properties for the current user wearing the HMD and one or more of the reference properties for a given user profile. A comparison of at least one detected property with a corresponding reference property of a given user profile can be used so that the given user profile can be selected depending on whether the degree of match indicates that the detected property and the corresponding reference property are substantially the same. For example, for a property such as user height, the detected user height can be compared with the reference property for a user profile corresponding to user height and a first criterion may be used, such as whether the two heights are within A cm (e.g. A=1 cm) of each other, such that the two heights are substantially the same when the first criterion is satisfied. Similarly, for another property such as user IPD, the detected IPD can be compared with the reference property for a user profile corresponding to IPD and a second criterion may be used, such as whether the two IPDs are within B cm (e.g. B=0.05 cm) of each other, such that the two IPDs are substantially the same when the second criterion is satisfied. Hence more generally, the selected user profile comprises data indicative of at least one reference property that is substantially the same as at least one of the one or more of the detected properties, in which one criterion for whether given detected property is substantially the same as a given reference property is whether a difference between the given detected property and the given reference property is less than a threshold amount. It will be appreciated that the threshold amount may be set to have a different value for different properties.

In some examples where the plurality of stored or accessible user profiles comprise a relatively small number of respective user profiles it may be possible to distinguish the respective user profiles from each other based on a single property. For example, for the case where there are three user profiles for which each respective user has a different height, then the reference property corresponding to user height can be capable on its own of distinguishing the respective user profiles. In this case, the control circuitry 930 may select a user profile for which the reference property corresponding to user height is substantially the same as the detected user height so that the selected user profile comprises a reference property that is substantially the same as a detected property. Other examples of single distinguishing properties for a small group of users may include user voice frequency, IPD, head size, and hand size, and iris pattern.

In other examples where the plurality of stored or accessible user profiles comprise a relatively large number of respective user profiles it may be possible to distinguish the respective user profiles from each other only based on a combination of two or more properties. For example, for the case where there are hundreds of user profiles for which some of the users have the same height (e.g. two or more users have a reference property corresponding to a height of 6 foot, 0 inches), then the reference property corresponding to user height is not capable on its own of distinguishing the respective user profiles. In this case, the control circuitry 930 may select a user profile for which two or more reference properties are substantially the same as two or more of the detected properties (e.g. both the detected height and a detected IPD are substantially the same as the reference height and reference IPD for a given user profile) so that the selected user profile comprises two or more reference properties that are substantially the same as a two or more of the detected properties.

In some examples, the control circuitry 930 is configured to compare one detected property for the current user with each of the plurality of stored user profiles and to select a user profile in dependence upon that detected property. For example, in some cases a detected property of an iris is enough on its own to distinguish one user in a large group of users. In other examples, the control circuitry 930 is configured to compare a plurality of detected properties for the current user with the plurality of stored user profiles and to select a user profile in dependence upon the plurality of detected properties. For example, a detected inter-pupillary distance of the current user may be substantially the same as the reference inter-pupillary distance for two or more user profiles in which case a combination of the detected inter-pupillary distance and another detected property, such as the height of the current user which is indicated by the detected displacement of the HMD relative to the floor, can be used to select one user profile that most closely matches the current user. It will be appreciated that any combination of the above mentioned detected properties can be used by the control circuitry 930 for selecting a user profile.

Hence more generally, the control circuitry 930 is configured to select a user profile in dependence upon one or more of the detected properties, wherein the selected user profile comprises data indicative of at least one reference property that is substantially the same as at least one of the one or more of the detected properties. Optionally the number of detected properties used may be increased to the extent required to identify one user, and optionally these may be selected in an order of certainty (either in terms of certainty of measurement or certainty of identification), and this order may differ depending on the size of the corpus of users. If all available properties are used and there is still a plurality of users that may fit, then optionally either this subset may be presented to the user to select from (e.g. with a subsequent verification step such as a password), or failure mode reverting to a request to log in or signup may be provided.

The data for the plurality of stored or accessible user profiles may be stored by storage circuitry (e.g. a hard disk drive or RAM unit) provided as part of the HMD 910 and/or storage circuitry provided as part of an external processing device, such as a game console. For example, the system 900 may comprise user profile storage circuitry (not shown in FIG. 8*a*) to store user profile data for the plurality of user profiles, such that the control circuitry 920 can be configured to obtain the user profile data for the plurality of user profiles from the user profile storage circuitry. In other examples, the user profile data for the plurality of stored or accessible user profiles may be stored by storage circuitry provided as part of a remote server, such as a cloud gaming server, and the user profile data for the plurality of user profiles can be wirelessly communicated to a processing device comprising the control circuitry 930. Therefore, in some cases the system 900 may comprise receiving circuitry to obtain (e.g. via a wireless communication) user profile data for each of the plurality of stored user profiles.

Each of the plurality of stored user profiles comprises data indicative of one or more reference properties for the respective user associated with that user profile, and the control circuitry 920 can be configured to: obtain the data for a given user profile; compare one or more of the reference properties for the given user profile with one or more of the detected properties for the current user wearing the HMD; and select the given user profile in dependence upon a degree of match between at least one reference property and at least one detected property for the current user wearing the HMD.

In embodiments of the disclosure, the one or more properties detected for the current user wearing the HMD by the one or more sensors 920, include: one or more properties of an iris of the eye of the current user; an inter-pupillary distance of the current user (a separation distance for the user's eyes); a voice of the current user; a displacement of the HMD from a floor indicative of a height for the current user; and one or more hand characteristics of a hand of the current user. Similarly, each of the plurality of stored user profiles comprises data indicative of one or more reference properties, in which the one or more reference properties comprise one or more from the list consisting of: one or more properties of an iris of the eye of the user; an inter-pupillary distance of the user (a separation distance for the user's eyes); a voice of the user; a height for the user; and one or more hand characteristics of a hand of the user. Any of the above mentioned properties either alone or in combination can be used for distinguishing one user from a plurality of users.

Example techniques for detecting the above mentioned properties for a current user wearing an HMD will now be discussed.

Optionally, one or more image sensors can be provided as part of the HMD to capture one or more images of the user's eye(s) when wearing the HMD to thereby detect a property of the iris. For example, an arrangement such as that shown in FIG. 6a or FIG. 6b comprising inwards-facing image sensors can be used for eye feature detection. Similarly, one or more image sensors provided as part of the HMD can be configured to capture one or more images of the user's eyes to thereby detect a separation distance for the respective eyes. The one or more image sensors each have a predetermined position with a predetermined field of view arranged to include at least one of the user's eyes when the HMD is worn. Any suitable iris detection algorithm known in the art may be used for detecting one or more properties for the iris in a captured image which can be used for distinguishing one user from another.

Each of the one or more image sensors can thus be configured to capture one or more images including the user's eye and to detect a position of one or more features of the eye from the captured image, such as the pupil and/or iris and/or sclera. A position of a detected feature with respect to the predetermined position of the image sensor is thus obtained. By calculating a position of a feature of the first eye with respect to an image sensor and calculating a position of a feature of the second eye with respect to another image sensor (or in some cases the same image sensor may capture an image including both eyes), the relative positions of the two respective features can be detected and used to calculate the user's eye separation. In some examples, contour extraction may be used to firstly detect an outline of an eye in an image and/or to detect an outline of an iris in the image. Colour segmentation may be used since the sclera region is generally white and surrounds the coloured iris region and the sclera region itself is surrounded by a skin region. In some cases a left-to-right (or right-to-left) scan may be carried out at a vertical image position in a captured image. A detection of a portion of skin-tone, followed by a detection of a portion of white or near-white (corresponding to the sclera), followed by a detection of a coloured portion corresponding to the iris, followed by a relatively darker portion corresponding to the pupil and so on may be used to detect the respective features of the eye. Hence more generally, the detectable features of an eye include the sclera, pupil and iris. In particular, a position corresponding to the centre of the pupil can be detected by detecting the left and right boundary of the pupil with the iris (in other words detecting the right extent and the left extent of the pupil) and taking the mid-point. Whilst detecting the centre of the pupil using the extent of the pupil (rather than another feature of the eye) can provide an accurate IPD for the user, the IPD may instead be detected using another feature. For example, the detecting the centre of the pupil may comprise detecting the left and right boundary of the sclera with the skin-tone and taking the mid-point and/or detecting the left and right boundary of the iris with the sclera and taking the mid-point (in some cases, two or more mid-point values may be averaged to obtain the position of the centre of the pupil). This processing can be repeated for both eyes to detect the centre of the respective pupils to thereby detect the user's inter-pupillary distance (IPD).

Optionally, at least one of the HMD and another processing device local to the user wearing the HMD comprises one or more microphones for detecting a voice of the current user wearing the HMD. A microphone can be located so as to receive sound signals corresponding to the current user's voice, and data indicative of the current user's voice can be communicated to the control circuitry 930 for comparison with a reference property corresponding to a voice recording for a user profile. In this case, one or more of the user profiles may store a reference property comprising a voice recording for the user associated with that user profile. For example, as part of a procedure for setting-up a user profile, as user may be requested to provide an audio input (e.g. speak their name) and a recording of at least part of the audio input can be stored as a reference property of the user's profile. Therefore, data indicative of the current user's voice can be compared with a voice recording for a user profile and the control circuitry 930 can select a user profile in dependence upon whether a degree of match between the detected voice and the voice recording satisfies a criterion. For example, the control circuitry 930 can be configured to perform a voice comparison by comparing a pitch (e.g. average pitch) for the detected voice of the current user with a pitch for a voice recording to identify whether a difference between the two pitches is less than a threshold amount and thus substantially the same.

Optionally, the HMD comprises one or more inertial sensors. An inertial sensor can be provided in the HMD to detect a displacement of the HMD with respect to a floor. The displacement of the HMD from the floor can be detected over time and an average displacement from the floor (e.g. mean, mode or median of a detected vertical position) can be calculated for comparison with a reference property for a user profile corresponding to a user's height. Alternatively or in addition, the HMD comprises one or more image sensors to capture images to the front of the HMD for head tracking purposes. The one or more image sensors thus generate data indicative of the detected displacement of the HMD from the floor which can be received by the control circuitry 930 for comparison with the plurality of stored user profiles. Alternatively or in addition, one or more image sensors provided as part of another processing device local to the current user wearing the HMD (such as a games console) can capture images including the HMD to thereby track the position of the HMD. The one or more image sensors can thus generate data indicative of the detected displacement of the HMD from the floor which can be received by the control circuitry 930 for comparison with the plurality of stored user profiles.

Optionally, one or more image sensors configured to capture images to the front of the HMD can be used to capture one or more images including a hand of the current user wearing the HMD. An image captured by a front-facing image sensor of the HMD can be used to detect one or more hand characteristics of the current user wearing the HMD. Data indicative of a detected hand characteristic can thus be received by the control circuitry 930 for comparison with the plurality of stored user profiles. Techniques for detecting a hand characteristic and using a detected hand characteristic for selecting a user profile from a plurality of stored user profiles will be discussed in more detail later.

In some embodiments of the disclosure, the control circuitry 930 is configured to compare a detected property with a corresponding reference property for each of the plurality of stored user profiles to thereby identify a user profile for which the reference property has a highest degree of match with the detected property. In this case, the control circuitry 930 can for example calculate a matching score (or a "difference score") for each user profile, in which the matching score is indicative of a degree of match between the detected property and the reference property for the user profile, and the control circuitry 930 selects the user profile having the matching score corresponding to the highest degree of match.

Figure 9:
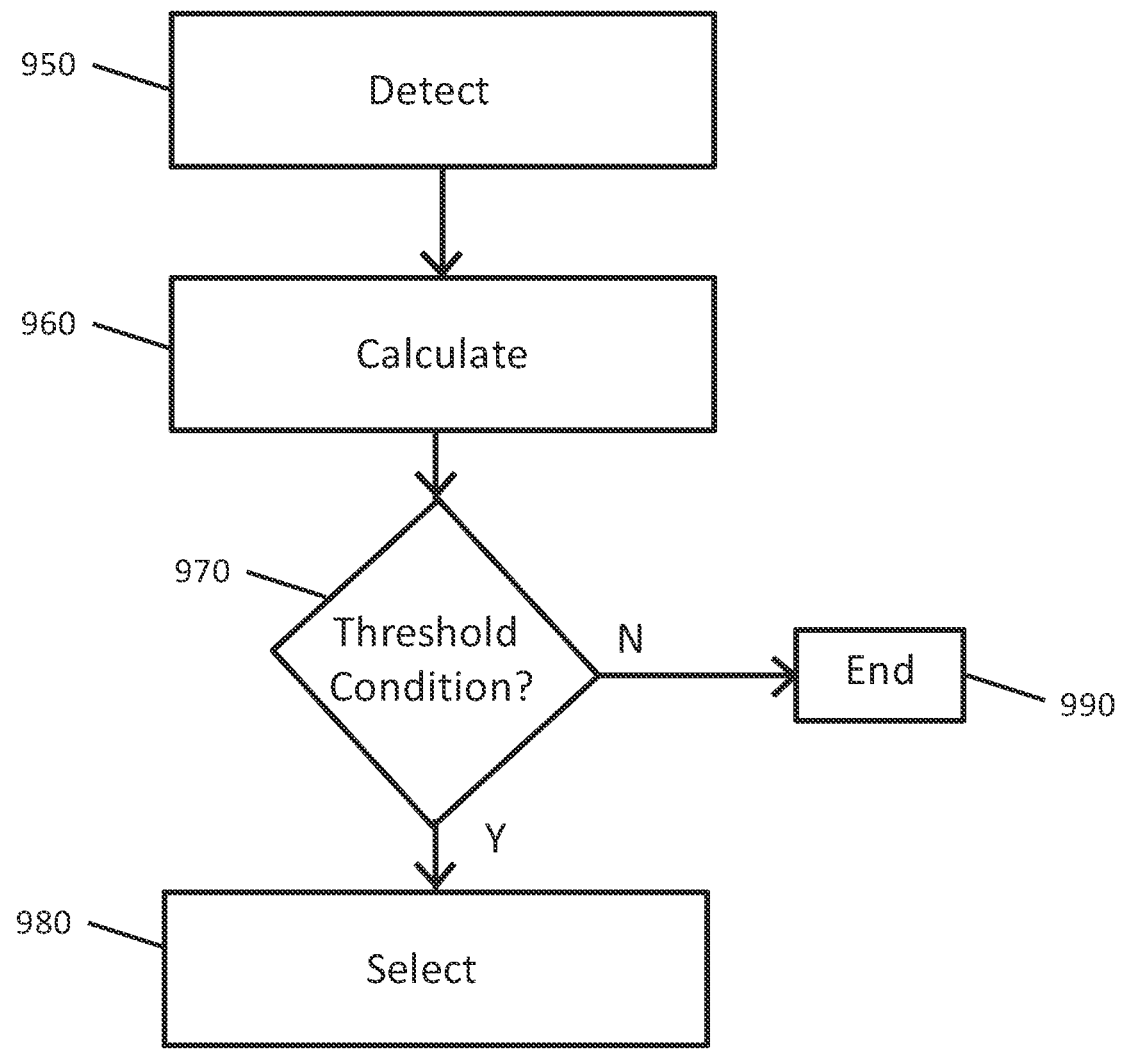
FIG. 9 schematically illustrates a process of selecting a user profile.

In some embodiments of the disclosure, the control circuitry 930 is configured to select the user profile from the plurality of stored user profiles in dependence upon whether a matching score calculated for a given user profile satisfies a predetermined threshold. FIG. 9 schematically illustrates an example of selecting a user profile using a predetermined threshold. At least one of the one or more sensors 920 is configured to detect (at a step 950) a property for the current user of the HMD. At a step 960, the control circuitry 930 is configured to receive data indicative of the detected property for the current user of the HMD and to calculate a matching score for each of the plurality of stored user profiles, in which a matching score for a respective user profile is dependent upon a difference between the detected property and the reference property for that user profile. For example, in the case of a detected height for the current user of X cm, the control circuitry 930 can calculate a matching score for a given user profile based on a difference between the detected height and the reference height of that user profile. For example, the control circuitry 930 may use the following calculation: matching score=|Detected_height−Reference_height|, such that in this example a smaller value for the matching score is indicative of a higher degree of match. Alternatively, another calculation may be used in which a larger value for the matching score is indicative of a higher degree of match (e.g. matching score=A−|Detected_height−Reference_height|, where A is a positive number that can be freely set such that for an exact match the matching score has a value of A).

The control circuitry 930 is configured to determine (at a step 970) whether the matching score indicative of the highest degree of match satisfies a predetermined threshold. For example, at the step 970 the matching score can be compared with a predetermined threshold value. It will be appreciated that depending on the calculation used to calculate the matching score, a larger value or a smaller value may be indicative of a higher degree of match. When it is determined at the step 970 that the matching score satisfies the predetermined threshold, the control circuitry 930 is configured to select (at a step 980), from the plurality of stored user profiles, the user profile associated with the matching score. When it is determined, at the step 970, that the matching score does not satisfy the predetermined threshold, the process ends (at the step 990) without selection of a user profile.

Alternatively, when it is determined, at the step 970, that the matching score does not satisfy the predetermined threshold, the process may return to the step 950 to detect another property for the current user of the HMD so that the process in FIG. 9 can be repeated for another detected property for the current user wearing the HMD. In this way, if a given sensor provides an inaccurate detection of a given property, then another detected property can be used in the process in FIG. 9. Alternatively, when the process shown in FIG. 9 ends without a selection of a user profile, the process may begin again in response to detecting that the detected property for the current user changes by a threshold amount (e.g. detected IPD or detected height changes by at least X mm) indicating that there has been a change of the current user wearing the HMD.

In some examples, the process illustrated in FIG. 9 may be repeated for each detected property. For example, in response to establishing that two or more of the user profiles satisfy the threshold condition at the step 970 for a first detected property, the process may then be repeated for a second detected property different from the first detected property to establish which of the two or more of the user profiles satisfy the threshold condition at the step 970 for the second detected property. It will be appreciated that the process may therefore be repeated as many times as necessary until a single user profile remains. Alternatively, in the case where the one or more sensors are used to detect N respective properties for the user wearing the HMD (where N is an integer greater than or equal to 2), the process illustrated in FIG. 9 may be performed for each of the respective properties and selection of a user profile may only be performed in the case where the user profile satisfies the threshold condition at the step 970 for each of the respective properties.

In embodiments of the disclosure, the control circuitry 930 is configured to detect a change of the current user of the HMD in response to a change in one or more of the detected properties, and wherein the control circuitry 930 is configured to select a second user profile from the plurality of stored user profiles in dependence upon one or more of the properties detected after the change of the current user.

Figure 10:
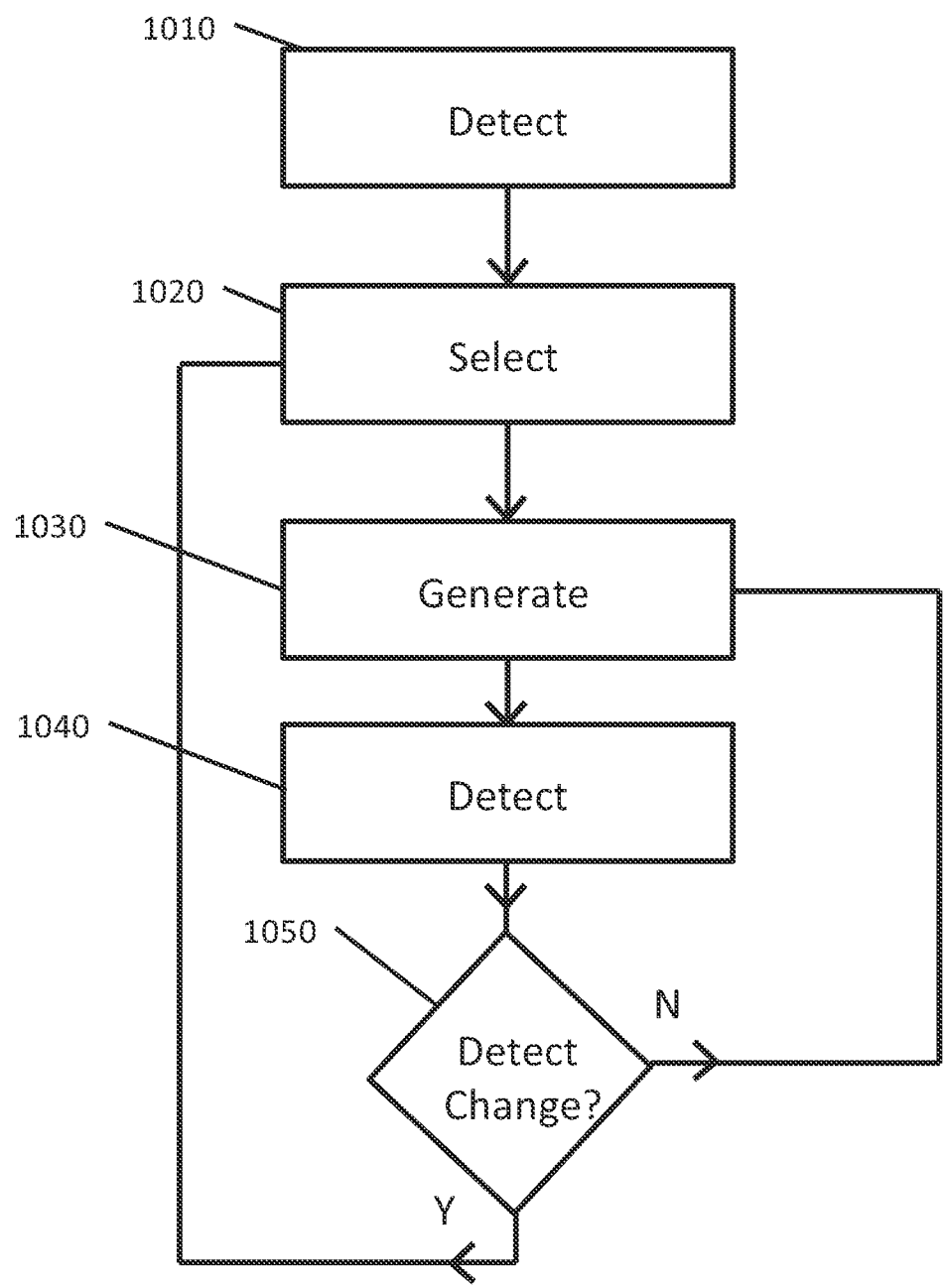
FIG. 10 schematically illustrates a process of detecting a change of a current user wearing an HMD.

FIG. 10 schematically illustrates an example of detecting a change of the current user of the HMD and selecting another user profile after the change of the current user of the HMD. In FIG. 10, at a step 1010 one or more properties are detected for the current user of the HMD using one or more of the sensors 920. At a step 1020, a first user profile is selected from the plurality of stored user profiles in dependence upon at least one of the detected properties. As discussed above, the first user profile may be the user profile having the highest degree of match, or the first user profile may be the user profile having the highest degree of match and also satisfying the predetermined threshold described with reference to FIG. 9. The first user profile selected at the step 1020 is thus selected in dependence upon one or more of the properties detected at the step 1010 so that the first user profile corresponds to the user wearing the HMD at the time of the step 1010. At a step 1030, at least one of audio and video content is generated for output by the HMD in dependence upon the first user profile. At a step 1040, at least one of the one or more properties is detected for the current user wearing the HMD. Therefore, at least one property detected at the step 1010 is detected again at the step 1040. When the control circuitry 930 detects, at a step 1050, a change of the current user wearing the HMD in response to a change in one or more of the detected properties, the process proceeds to the step 1020 to select a second user profile from the plurality of stored user profiles in dependence upon at least one of the properties detected at the step 1040. When at the step 1050 the current user wearing the HMD has not changed, the process proceeds to the step 1030 to continue to generate at least one of audio and video content in accordance with the first user profile selected at the step 1020.

Therefore, the control circuitry 930 firstly selects a first user profile from the plurality of user profiles in dependence upon one or more detected properties for the current user wearing the HMD and in response to a change in one or more of the detected properties, the control circuitry 930 can subsequently perform another selection from the plurality of user profiles using a subsequently detected property so as to select a second user profile different from the first user profile.

The one or more sensors 930 detect a property for the current user wearing the HMD and the control circuitry 930 can be configured to periodically obtain data indicative of a detected property. The control circuitry 930 can therefore detect whether there has been a change of the current user wearing the HMD based on a periodic analysis of one or more of the detected properties. The control circuitry 930 may detect that there has been a change of user wearing the HMD by periodically analysing a given detected property to identify a change in the given detected property that indicates that the HMD is no longer worn by the same user. For example, if an IPD of Y cm is detected at a time t1 (e.g. at the step 1010) and an IPD of Z cm (Y≠Z) is detected at a time t2 (e.g. at the step 1040), this is an indication that there has been a change of the current user wearing the HMD. Alternatively or in addition, if a height (displacement of the HMD from the floor) of Y1 cm is detected at a time t1 (e.g. at the step 1010) and a height of Z1 cm (Y1≠Z1) is detected at a time t2 (e.g. at the step 1040), this is also an indication that there has been a change of the current user wearing the HMD.

In embodiments of the disclosure, the control circuitry 930 is configured to detect the change of the current user wearing the HMD in response to a change in one or more of the detected properties by at least a threshold amount. Hence, in some cases a single detected property may be monitored over time for detecting whether there is a change of user. A first threshold amount may be used for a first detected property and a second threshold amount, different from the first threshold amount, may be used for a second detected property. For a system comprising a plurality of sensors configured to detect a plurality of respective properties for the current user, any one of the detected properties or each of the detected properties may be monitored over time for detecting whether there is a change of user.

The control circuitry 930 can detect a change of the current user wearing the HMD based on an evaluation of a first detected property detected at a first time with respect to the first detected property detected at a second time, wherein the second time is subsequent to the first time. The control circuitry 930 detects a change of the current user wearing the HMD in response to the first detected property changing by at least a threshold amount between the first time and the second time. In some cases, the control circuitry 930 may analyse a first voice recording detected at the first time to calculate an average frequency (mean, mode or median) and may also analyse a second voice recording detected at the second time to calculate an average frequency so that the two average pitches can be compared and if a difference between the two average pitches is greater than a threshold amount this indicates that there has been a change of the current user. It will be appreciated that other detected properties may similarly be used for detecting a change of the current user.

Similarly, in the case where a user is currently wearing the HMD and then removes the HMD so that the HMD is not worn by any user, the control circuitry 930 can detect that there has been a change of user, as a detected property will accordingly change by more than a threshold amount. For example, in the case where a user removes the HMD and rests the HMD on a surface, such as a table, the detected property for the height of the HMD will change by more than a threshold amount. Similarly, for example, the detected property for the IPD will also change by more than a threshold amount.

In embodiments of the disclosure, the control circuitry 930 is configured to detect the change of the current user wearing the HMD in response to a change in one or more of the detected properties indicative of a predetermined movement of the HMD. A predetermined movement of the HMD can be detected by tracking the HMD using at least one of: an image sensor provided as part of the HMD (e.g. a front facing image sensor for inside-out tracking); an image sensor provided as part of another processing device for capturing images including the HMD; and one or more inertial sensors provided as part of the HMD. A predetermined movement corresponding to a movement for removing an HMD from a user's head may be used, such as a combination of: an upward movement in a vertical direction, followed by a movement in a horizontal direction, followed by a downward movement in the vertical direction. Alternatively or in addition, a predetermined movement corresponding to a movement for removing an HMD from a user's head and placing an HMD on a surface may be used, such as a detection of a movement from a first vertical position to a second vertical position followed by an absence of movement for at least a predetermined period of time. Hence, a change of the current user wearing the HMD can be detected when the HMD undergoes a predetermined movement and one or more properties detected after the predetermined movement can be used by the control circuitry 930 to select a user profile from the plurality of stored user profiles.

As such, in the case where a first user removes the HMD and passes the HMD to another user, one or more detected properties detected for the another user after the detection of the predetermined movement can be used to select the user profile corresponding to the another user. Alternatively, in the case where the first user removes the HMD and rests the HMD on a surface rather than passing the HMD to another user, the change in the one or more detected properties will be such that no user profile will be selected when evaluating the one or more detected properties with respect to the stored user profiles and the first user's profile will therefore not be selected after the first user has removed the HMD.

In some embodiments of the disclosure, rather than evaluating a detected property for the current user wearing the HMD with respect to a reference property for each of the plurality of stored user profiles, the control circuitry 930 is configured to select one or more candidate user profiles from the plurality of stored user profiles and to evaluate one or more of the detected properties with respect to the one or more candidate user profiles to thereby select the user profile from the one or more candidate user profiles. For example, the example processes illustrated in FIGS. 9 and 10 may be performed using one or more candidate user profiles from the plurality of stored user profiles rather than using each of the plurality of stored user profiles. In some examples, the processes illustrated in FIGS. 9 and 10 may firstly be performed using one or more candidate user profiles from the plurality of stored user profiles and in response to the process ending without a selection of a user profile (when none of the one or more candidate user profiles satisfy the threshold condition) then the process may be repeated using the remaining user profiles not included in the one or more candidate user profiles.

The one or more candidate user profiles correspond to a subset of the plurality of stored user profiles. The one or more candidate user profiles are selected so that a detected property can firstly be evaluated with respect to just a subset of the stored user profiles to improve processing efficiency. The one or more candidate user profiles represent a subset of the stored user profiles with a higher likelihood of corresponding to the current user wearing the HMD. A number of possibilities for selecting the one or more candidate user profiles will now be discussed.

In embodiments of the disclosure, the one or more candidate user profiles comprise one or more from the list consisting of: i) a predetermined number of the stored user profiles most recently selected by the control circuitry; ii) a predetermined number of the stored user profiles selected in advance by a user; iii) each of the stored user profiles previously selected within a predetermined time period by the control circuitry; and iv) a predetermined number of the stored user profiles previously selected by the control circuitry at least a threshold number of times.

The control circuitry 930 can be configured to store a log (record) of each of the user profiles that has been selected by the control circuitry 930 and the log can be used to identify, as candidate user profiles, some of the user profiles with a higher likelihood of being used in the future. In some cases, a predetermined number of the most recently selected user profiles can be selected as the one or more candidate user profiles. The N (e.g. N=5) most recently selected user profiles can be selected as candidate user profiles because there is a higher likelihood that the users associated with these user profiles will use the HMD again, whereas another user profile not selected in the last N times has a lower likelihood of being used again. Alternatively or in addition, each of the user profiles previously selected within a predetermined period of time can be selected as the one or more candidate user profiles. For example, any of the user profiles previously selected within the last 24 hours, or 48 hours, week or month, for example, may be selected as the plurality of candidate user profiles. Alternatively or in addition, a predetermined number of the stored user profiles previously selected by the control circuitry 930 at least a threshold number of times can be selected as the one or more candidate user profiles. For example, a threshold number M (e.g. M=2) may be used so that any user profile that has been previously selected at least M times is selected as a candidate user profile. Alternatively or in addition, a user can manually specify that one or more of the stored user profiles are candidate user profiles by providing a user input for selecting one or more of the stored user profiles.

In embodiments of the disclosure, the control circuitry 930 is configured to select one or more of the candidate user profiles from the plurality of stored user profiles by selecting a given user profile, from the plurality of stored user profiles, as being a candidate user profile in dependence upon at least one of: a location of a user associated with a most recently selected user profile with respect to a location of the given user associated with the given user profile; and a location of the HMD with respect to the location of the given user associated with the given user profile. A location of a user associated with a user profile can be detected using a GPS enabled device for the user (e.g. a smart watch or smartphone). For example, each user may log into their user profile on a user device (such as the user's smartphone or smartwatch) and the location of the user device can be tracked whilst the user is logged in to their user profile, and information indicative of the location of the user device (and thus the user) can be communicated to a server and stored in association with the user's user profile. For example, each user may log in to their user profile on an application (e.g. PlayStation® App) on their user device. The location information associated with a given user profile may indicate either a current location for that given use or a most recent location for the given user. The control circuitry 930 can be configured to receive information indicative of a location associated with a user profile from the server. In this way, a location of the user associated with the most recently selected user profile (most recently selected by the control circuitry 930 which corresponds to the current user wearing the HMD when the HMD is being worn) with respect to a location of a given user associated with a given user profile of the plurality of stored user profiles can be used for determining whether to select the given user profile as a candidate user profile. A condition such as whether the location of the user associated with the most recently selected user profile and the location of the given user associated with the given user profile are within a predetermined distance of each other can be used when determining whether to select the given user profile as a candidate user profile. The control circuitry 930 can select the given user profile as a candidate user profile in dependence upon whether the location information associated with the given user profile indicates that the given user is within X metres (e.g. X=20 metres) of the location indicated by the location information associated with the most recently selected user profile.

Alternatively or in addition, the HMD may optionally comprise a receiver for receiving Global Position System (GPS) signals and circuitry configured to detect a location of the HMD in dependence upon the GPS signals. In this case, the control circuitry 930 can be configured to receive information indicative of a location of the HMD. A location of the HMD with respect to a location of a given user associated with a given user profile of the plurality of stored user profiles can be used for determining whether to select the given user profile as a candidate user profile. A condition such as whether the location of the HMD and the location of the given user associated with the given user profile are within a predetermined distance of each other can thus be used when determining whether to select the given user profile as a candidate user profile. As such, the control circuitry 930 can select the given user profile as a candidate user profile in dependence upon whether the location information associated with the given user profile indicates that the given user is within the predetermined distance of the location indicated by the location information received from the HMD.

Alternatively or in addition to the use of GPS signals, a location of a user associated with a user profile can be detected as being within a predetermined distance of the location of the HMD using one or more captured images for the environment including the HMD. An image sensor provided as part of the HMD and/or an image sensor provided externally to the HMD can capture one or more images of the environment including the HMD and the captured images can be used to identify a user associated with a stored user profile using known facial recognition techniques. Facial recognition techniques can be used to detect face properties included in one or more images captured for the environment including the HMD. In the case of a stored user profile comprising a reference property corresponding to a set of face properties of the user associated with the user profile, the control circuitry 930 can identify a user profile for which the reference property matches the detected face in the captured image(s) of the environment and select that user profile as a candidate user profile. Therefore, one or more user profiles corresponding to one or more respective users in the captured images of the environment including the HMD can be selected as a candidate user profile because the one or more respective users are located in the same environment as the HMD and thus within the predetermined distance (e.g. X=20 metres) of the HMD. Therefore, upon detecting a presence of a user in a captured image, the user profile associated with that user can be selected as a candidate user profile. In some examples, for a given user profile selected as a candidate user profile based on detecting the presence of the user in a captured image, the given user profile may remain selected as a candidate user profile for a predetermined period of time (e.g. 24 hours) following the detection of the presence of the user.

Hence more generally, the control circuitry can be configured to select a given user profile of the plurality of stored user profiles as being a candidate user profile in dependence upon whether a location of the given user is within a predetermined distance of at least one of a location of the HMD and a location of a user associated with a most recently selected user profile.

As discussed previously, in some embodiments of the disclosure the one or more sensors 920 comprise an image sensor configured to detect a hand of the current user wearing the HMD. One or more image sensors may be arranged to capture an image including the hand of the user by providing an image sensor on a front portion of the HMD and/or providing an image sensor as part of a processing device, such as a games console, positioned in front of the user. An image sensor can thus be configured to capture and image and detect one or more hand characteristics for a hand in the captured image. Known image recognition techniques may be used for detecting one or more properties of hand in a captured image. A property associated with a user's hand can be detected and evaluated with respect to a corresponding reference property of a stored user profile for establishing which of the stored user profiles corresponds to the current user wearing the HMD. As part of a procedure for setting up a user profile, a user may be requested to capture one or more images of one or both of their hands using any image sensor so that one or more reference properties for the user's hand(s) can be stored as part of the user's profile for later use in automatically identifying whether the user is wearing an HMD. Any of the one or more hand characteristics discussed below may be stored as a reference property for a user's user profile so that the reference property can be evaluated with respect to a detected property of the current user's hand when selecting a user profile from the plurality of user profiles.

In embodiments of the disclosure, the one or more hand characteristics comprise a relative size of respective detected features of the hand. A difference between a size of a first feature (e.g. first portion) of a hand and a size of a second feature (e.g. second portion) of a hand in a captured image of the hand can be detected by an image sensor. For example, a length associated with a first hand feature and a length associated with another hand feature can be detected and information indicative of a ratio of the two lengths can thus be output by the image sensor for use by the control circuitry 930 when selecting a user profile. Examples of detected hand features include: a length of a respective digit (e.g. index finger/ring finger/little finger/thumb); a length from the base of the palm to the tip of a digit of the hand; and a palm width. Therefore, the control circuitry 930 is configured to receive information indicative of a size of one hand feature relative to a size of another hand feature. In some examples, the received information is indicative of a ratio such as N:M, where N corresponds to a length of a first feature and M corresponds to a length of the second feature. In some examples, the received information may be indicative of a ratio such as N:M:O, where N, M and O correspond to lengths of respective features. Hence more generally, a hand characteristic may comprise a ratio of the respective sizes of a plurality of respective features of the hand.

In embodiments of the disclosure, the one or more hand characteristics comprise one or more detected markings on the hand. Some users may have one or more markings on their hand that are detectable in a captured image. Examples of such markings include: scars; tattoos; freckles and birth marks. One or more markings on a hand can thus be detected by one or more image sensors and information indicative of one or more of the detected markings can be received by the control circuitry 930 for selecting a user profile.

In embodiments of the disclosure, the one or more hand characteristics comprise a detected skin colour for the hand. Known skin detection algorithms for detecting skin-coloured pixels in a captured image can be used. Example techniques for image-based human skin detection are disclosed in "Human Skin Detection Using RGB, HSV, YCbCr Color Models", S. Kolkur et al, ICCASP 2016, the entire contents of which are herein incorporated by reference.

One or more skin-coloured pixels for the user's hand can be detected and colour information for the user's hand is thereby obtained in dependence upon a pixel value associated with one or more of the skin-colour pixels. In this case, a user profile may comprise a reference property corresponding to a skin colour of a user's hand, such that the reference property and the detected skin colour can be evaluated to assess whether the user profile is a match for the current user wearing the HMD.

However, a skin colour detected for a given user from a captured image may vary for different lighting conditions. Therefore, a consistency problem can potentially arise in that a detected skin colour for a same person can vary for different lighting conditions. For example, under brighter lighting conditions, such as for an outdoor environment, a first skin colour may be detected whereas under darker lighting conditions, such as a poorly lit indoor environment, a second skin colour different from the first skin colour may be detected.

In embodiments of the disclosure, the one or more sensors 920 comprise an image sensor configured to detect a controller held by the hand of the current user wearing the HMD, and wherein the control circuitry 930 is configured to apply a correction to the detected skin colour for the hand in dependence upon a difference between a detected colour of the controller and a predetermined reference colour for the controller. To overcome the above mentioned consistency problem, information regarding a predetermined colour of a controller can be used as a reference so that a detected skin colour for the hand in a captured image can be adjusted to obtain a corrected skin colour for the user's hand that corrects for the lighting of the environment at the time of capturing the image of the user's hand. In this way, the lighting conditions at the time of detecting the skin colour can be corrected for to obtain a corrected skin colour that is independent of the lighting conditions, and the corrected skin colour can be used by the control circuitry 930 for comparison with a reference property corresponding to a skin colour stored for a given user profile.

During the setting up of a user profile by a user, the user can capture one or more images including their hand(s) as well as an object of a known reference colour (e.g. a controller having a known reference colour) so that a colour of the user's skin can be detected from the captured image and a correction can be applied to the detected skin colour in dependence upon a difference between the detected colour of the object in the image and the known reference colour for the object. In this way, the lighting conditions at the time of capturing the image can be corrected for so that a reference property indicative of the skin colour of the user's hand can be stored for the user's profile. In some cases, the object of known colour may be the handheld controller referred to above, however the object may be any object of a known reference colour.

In embodiments of the disclosure, the one or more sensors 920 comprise an image sensor configured to detect a controller held by the hand of the current user wearing the HMD, and wherein the control circuitry 930 is configured to calculate a size of a respective feature of the hand in dependence upon either a detected size of the controller or a detected size of a portion of the controller. In some embodiments of the disclosure, the one or more detected properties comprise a size of a detected feature of the hand of the current user wearing the HMD. For example, a size such as a length of one or more of the user's digits may be stored as a reference property. Using the controller as a reference object in a captured image, the known size of the controller or a portion of the controller can be used to calculate a size for a feature of the hand and the size of the detected feature can thus be used by the control circuitry 930 for selecting a user profile.

In addition to detected properties that relate to distinguishing physical aspects of the user such as height, IPD, skin tone, and the like, optionally detected properties can also comprise behavioural aspects of the user, which can each be evaluated with respect to corresponding reference properties for a stored user profile. These properties can include dynamic physical aspects, such as how the user holds a controller when at rest (e.g. its angle and/or its height which may be detected by an image sensor provided as part of the HMD or another data processing apparatus), whether and to what extent they alter their gaze before turning their head when looking at visual stimulus, whether and how they gesticulate, characteristic motions relating to how they put the HMD on (e.g. flicking back hair or adjusting glasses), whether they sway or bounce during play, and the like. Other behavioural aspects may relate to how they interact with a particular game or games, or with features of the operating system or hardware—for example a certain user may habitually reduce the volume setting when receiving the HMD from a certain family member, or briefly check their chat log or friends list on the system. A further behavioural aspect may relate to when they play, with for example younger family members playing in mid to late afternoon, and older members in the evening.

One or more such behavioural aspects may be included as further detected properties for the purpose of identifying the current user.

In embodiments of the disclosure, selected user profile comprises one or more from the list consisting of: one or more display settings; one or more audio settings; and saved data for one or more video games. Each user profile comprises user-specific data for the user associated with that user profile. Individual users can create a user profile to include one or more display settings so that one or more of the display settings can be used to customise images generated for display to the user by the HMD when the user's profile is selected by the control circuitry 930. Examples of displays settings include: an image brightness setting; a configuration of one or more graphical user interfaces; and a field of view setting for an HMD. For example, one or more display settings can be used to customise types of information that are to be included in a graphical user interface and/or to customise a location at which types of information are to be included in a graphical user interface. Hence more generally, when the control circuitry 930 selects a given user profile, the processing circuitry 940 can generate video content for output by the HMD according to one or more display settings for the given user profile so that one or more of the images displayed by the HMD are adapted for the current user. wearing the HMD.

Similarly, individual users can create a user profile to include one or more audio settings. Examples of audio settings include: one or more volume settings; one or more bass settings; one or more music recordings; and at least one head-related transfer function (HRTF). For example, a given user profile may comprise an audio setting for specifying a volume setting for a game session, an audio setting for specifying a volume setting for a home screen (e.g. menu screen). In some examples, a user may set respective volume settings for respective sound types. Similarly, the one or more audio settings may indicate one or more music recordings previously specified by the user for output either during a game session or when viewing a menu screen. The one or more display settings may indicate a head-related transfer function (HRTF) for the user, in an HRTF specifies how an ear of the user receives sounds from specific points. In some examples, the one or more audio settings comprise an HRTF for each of the user's ears such that the HRTFs are used by the processing circuitry 940 for generating audio content for output by the HMD to provide realistic binaural audio. Hence more generally, when the control circuitry 930 selects a given user profile, the processing circuitry 940 can generate audio content for output by the HMD according to one or more audio settings for the given user profile so that one or more audio signals output by the HMD are adapted for the current user. wearing the HMD.

Alternatively, or in addition, a given user profile may comprise saved data for one or more video games for allowing a user to save their progress in a video game and resume play of that video game from a saved game state. In this way, when wearing the HMD, the current user's user profile can be automatically selected and one or more saved game states can be accessed by the current user.

Figure 11:
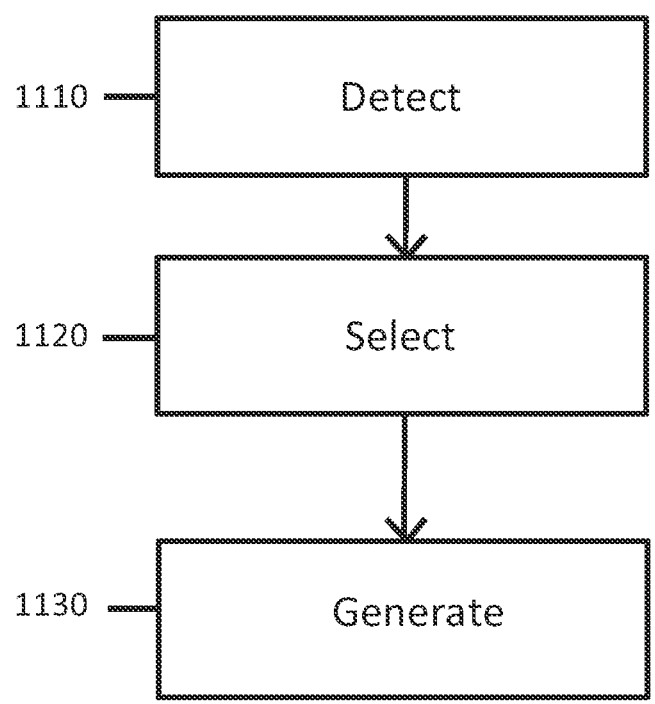
FIG. 11 is a schematic flowchart illustrating a data processing method.

Referring now to FIG. 11, in embodiments of the disclosure a data processing method comprises:

- detecting (at a step 1110), by one or more sensors, one or more properties for a current user of a head mountable display (HMD) (e.g. a user wearing or preparing to wear the HMD);
- selecting (at a step 1120) a user profile from a plurality of stored user profiles in dependence upon one or more of the detected properties, wherein each stored user profile is associated with a respective user and comprises data indicative of one or more reference properties for the respective user, wherein the selected user profile comprises data indicative of at least one reference property that is substantially the same as at least one of the one or more of the detected properties; and
- generating (at a step 1130) at least one of audio and video content for output by the HMD in dependence upon the selected user profile and in response to the selection of the user profile.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
   one or more sensors to detect one or more properties for a current user of a head-mountable display (HMD);
   control circuitry to select a user profile from a plurality of stored user profiles in dependence upon one or more of the detected properties, wherein each stored user profile is associated with a respective user and comprises data indicative of one or more reference properties for the respective user, wherein the selected user profile comprises data indicative of at least one reference property that is substantially the same as at least one of the one or more of the detected properties; and
   processing circuitry to generate at least one of audio and video content for output by the HMD in dependence upon the selected user profile and in response to the selection of the user profile, wherein:
   the one or more sensors comprise an image sensor and the one or more detected properties comprise one or more hand characteristics of a hand of the current user wearing the HMD,
   the one or more hand characteristics comprise a detected skin colour for the hand, and the image sensor is configured to detect a controller held by the hand of the current user, and wherein the control circuitry is configured to:
   apply a correction to the detected skin colour in dependence upon a difference between a detected colour of the controller and a predetermined reference colour for the controller.

2. A system according to claim 1, wherein the control circuitry is configured to detect a change of the current user of the HMD in response to a change in one or more of the detected properties, and wherein the control circuitry is configured to select a second user profile from the plurality of stored user profiles in dependence upon one or more of the properties detected after the change of the current user.

3. A system according to claim 2, wherein the control circuitry is configured to detect the change of the current user of the HMD in response to a change in one or more of the detected properties by at least a threshold amount.

4. A system according to claim 2, wherein the control circuitry is configured to detect the change of the current user of the HMD in response to a change in one or more of the detected properties indicative of a predetermined movement of the HMD.

5. A system according to claim 1, wherein the control circuitry is configured to detect a change of the current user of the HMD based on a periodic analysis of one or more of the detected properties.

6. A system according to claim 1, wherein the one or more candidate user profiles comprise one or more from the list consisting of:
   a predetermined number of the stored user profiles most recently selected by the control circuitry;
   a predetermined number of the stored user profiles selected in advance by a user;
   each of the stored user profiles previously selected within a predetermined time period by the control circuitry; and
   a predetermined number of the stored user profiles previously selected by the control circuitry at least a threshold number of times.

7. A system according to claim 1, wherein the one or more detected properties comprise a displacement of the HMD from a floor indicative of a height for the current user wearing the HMD.

8. A system according to claim 1, wherein the one or more detected properties comprise one or more of:
   one or more properties of an iris of an eye of the current user;
   an inter-pupillary distance of the current user;
   a voice of the current user; and
   one or more behavioural aspects of the current user.

9. A system according to claim 1, wherein the selected user profile comprises one or more of:
   one or more display settings;
   one or more audio settings; and
   saved data for one or more video games.

10. A data processing method, comprising:
    detecting, by one or more sensors, one or more properties for a current user of a head-mountable display (HMD);
    selecting a user profile from a plurality of stored user profiles in dependence upon one or more of the detected properties, wherein each stored user profile is associated with a respective user and comprises data indicative of one or more reference properties for the respective user, wherein the selected user profile comprises data indicative of at least one reference property that is substantially the same as at least one of the one or more of the detected properties; and generating at least one of audio and video content for output by the HMD in dependence upon the selected user profile and in response to the selection of the user profile, wherein:

the one or more sensors comprise an image sensor and the one or more detected properties comprise one or more hand characteristics of a hand of the current user wearing the HMD;

the one or more hand characteristics comprise a detected skin colour for the hand;

the detecting step comprises detecting, using the image sensor, a controller held by the hand of the current user, and the method further comprises:

applying a correction to the detected skin colour in dependence upon a difference between a detected colour of the controller and a predetermined reference colour for the controller.

11. A non-transitory, computer readable storage medium containing computer software which, when executed by a computer, causes the computer to carry out a data processing method comprising:

detecting, by one or more sensors, one or more properties for a current user of a head-mountable display (HMD);

selecting a user profile from a plurality of stored user profiles in dependence upon one or more of the detected properties, wherein each stored user profile is associated with a respective user and comprises data indicative of one or more reference properties for the respective user, wherein the selected user profile comprises data indicative of at least one reference property that is substantially the same as at least one of the one or more of the detected properties; and generating at least one of audio and video content for output by the HMD in dependence upon the selected user profile and in response to the selection of the user profile, wherein:

the one or more sensors comprise an image sensor and the one or more detected properties comprise one or more hand characteristics of a hand of the current user wearing the HMD;

the one or more hand characteristics comprise a detected skin colour for the hand;

the detecting step comprises detecting, using the image sensor, a controller held by the hand of the current user, and the method further comprises:

applying a correction to the detected skin colour in dependence upon a difference between a detected colour of the controller and a predetermined reference colour for the controller.

* * * * *